Patented Oct. 12, 1926.

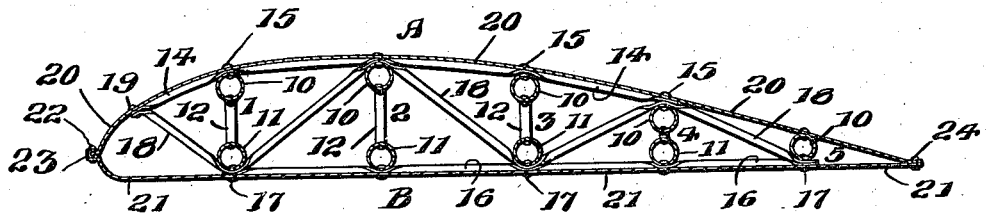
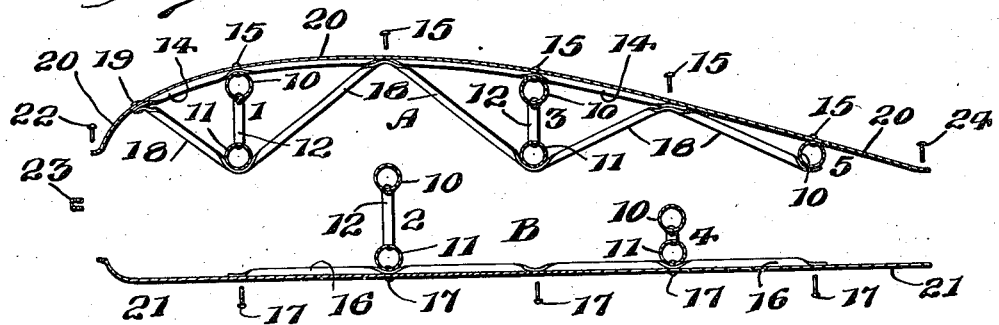
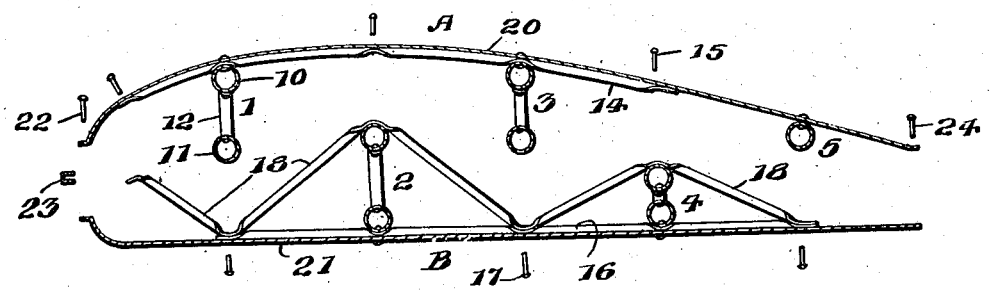

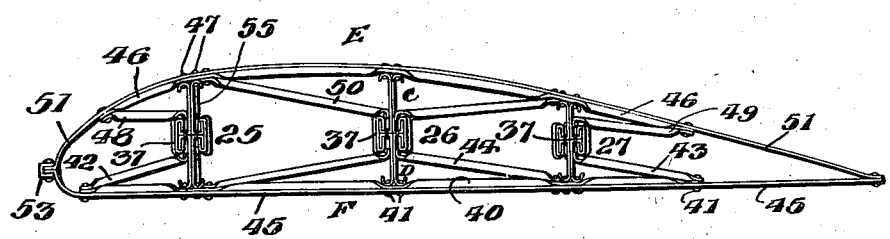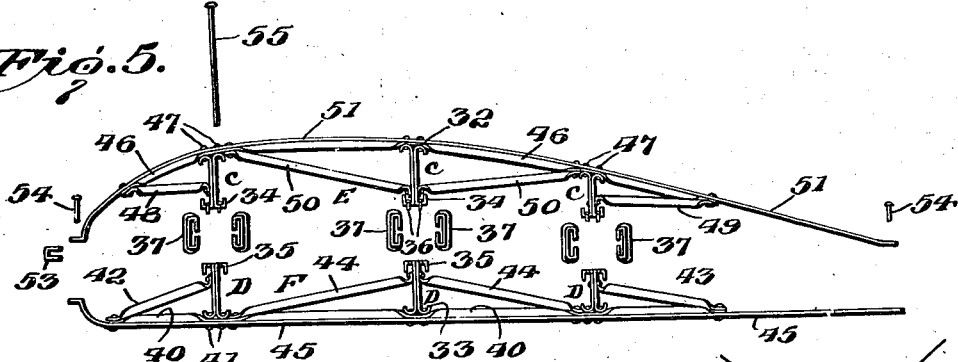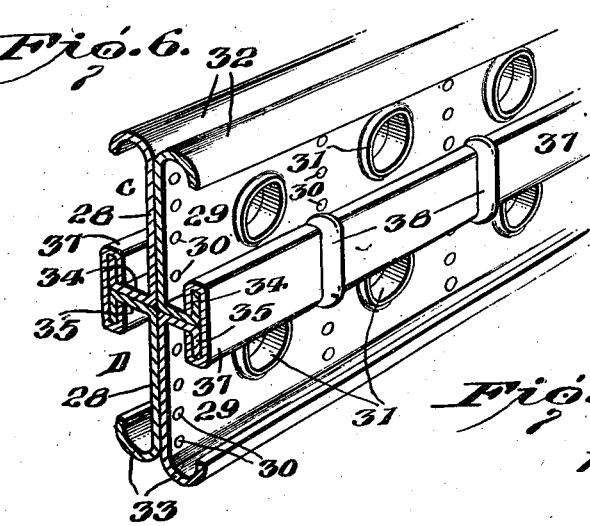

1,603,051

UNITED STATES PATENT OFFICE.

RANDOLPH F. HALL, OF ITHACA, NEW YORK, ASSIGNOR OF ONE-THIRD TO THEODORE P. HALL, OF WALLINGFORD, CONNECTICUT, AND ONE-SIXTH TO PAUL WILSON, OF ITHACA, NEW YORK.

AIRPLANE.

Application filed January 31, 1923. Serial No. 616,126.

This invention relates to certain improvements in airplanes; and the nature and objects of the invention will be readily recognized and understood by those skilled in the arts involved in the light of the following explanation and detailed description of the accompanying drawings illustrating what I now consider to be the preferred embodiments or mechanical expressions of the invention from among various other forms, arrangements, combinations and constructions of which the invention is capable within the spirit and scope thereof.

This invention deals generally with those types of units, parts or elements of aircraft characterized by trussing, framing, bulkheads, or such like structure enclosed within a skin or suitable covering attached thereon and thereover; and the invention is more particularly directed to certain problems encountered in the design, construction and assembly of airplane supporting surfaces or wings, and control surfaces, formed of metal trussing or framing enclosed within and covered by a metal skin, although likewise applicable to such elements when formed and constructed of other materials, or combinations of materials, than metal.

In the construction and assembly of all-metal airplane wings and similar or equivalent elements of aircraft generally, the metal wing frames are first constructed and assembled, and then the metal skin is attached and secured thereon and thereover enclosing the frames to form therewith the completed wing, or panel or section thereof as the case may be. The metal skin is generally applied over and covering the upper and lower sides of the frame by riveting the skin to the frame members. Now, in constructing and assembling wings of this type a serious problem arises from the considerable difficulty encountered in the operation of applying and riveting the metal skin on and over the completed wing frame, due to the limited and restricted space within the wing in which to properly apply and internally back up the rivets for attaching the metal skin to the wing frame. This difficulty is encountered in a maximum degree in the operation of attaching and riveting the last applied skin or section thereof to the wing frame, which closes the wing and completes the enclosure and covering of the frame.

The above difficulties and problem mentioned, together with certain other conditions inherent in the construction referred to, result in the formation of wings and such like elements of this general type, in which there is considerable possibility of the skin being insecurely attached to and on the frame through the presence of improperly applied and secured rivets, so that in service the skin may become loosened or detached from the frame by the shearing or pulling of such rivets from attached position. Further, the construction and assembly of such types of wings involving the various difficulties and conditions referred to, is an operation which requires considerable time and painstaking work, with a relative high cost of production.

With the referred to general types of all-metal wings and other elements having similar structural characteristics, after the wing is completed with the skin attached in position covering and enclosing the wing frame it is not possible to inspect the interior of the wing without detaching and removing the skin or a portion thereof from the frame, and in the event of damage to such a wing in service it is seldom possible to repair or replace any part or portion thereof without detaching the skin. Thus, a further serious disadvantage is inherent in such types of wings and similar aircraft elements, due to the fact that they cannot be practically or readily disassembled or knocked down for inspection or repair without detaching the covering skin from the frame to which it is riveted, or otherwise attached.

One of the main objects of the present invention, therefore, is to solve the several problems and overcome the various difficulties encountered in the construction and assembly of aircraft elements having the structural characteristics of a frame covered and enclosed within a skin attached thereon, such for example as airplane wings; and particularly to overcome the difficulties encountered in properly applying and attaching the skin or covering to a frame enclosed and covered thereby.

A further object of the invention is the provision of a design of airplane wing or similar aircraft element, and a method of constructing and assembling the same, in which the skin or covering can be readily applied and secured in attached position to the frames without interference from the frames or from sections of the skin first applied, due to restricted or confined working space, so that the time and work involved in the construction and assembly of such elements is materially reduced with an increase in production and reduction in cost thereof.

A further object of the invention is to provide a design of airplane wing of the all-metal type and a method of constructing and assemblying the same, in which the metal skin or covering is riveted or attached to the frames before complete assembly thereof and before completion and closure of the wing by the skin, so that the operation of applying the rivets or other securing means for attaching the skin to the frame is not interfered with due to restricted operating or working space.

A further object of the invention is to provide a design and construction of airplane wing of the all-metal type which can be readily disassembled for inspection, repair or replacement without removing or detaching the skin or covering of the wing from attached position on the wing frame.

A further object of the invention is to provide an aircraft element having the structural characteristic of a frame enclosed within and covered by a skin or covering attached thereon, in which the frame is formed in units and each unit is provided with a section of the skin attached thereon, so that the units with the skin can be assembled to form the completed frame enclosed within and covered by the skin, to avoid and overcome the disadvantages of attaching the enclosing skin on the complete assembled frame.

A further object of the invention is to provide an airplane wing or similar element formed of upper and lower units, each unit comprising a portion of the wing frame and trussing and the upper or lower skin of the wing attached thereon, so that, when the units are assembled the complete wing frame and trussing, enclosed within the skin or covering, is formed to provide the complete wing; and to further so form the units of the wing that they may be detached and the wing disassembled without removing the skin from attached position on the respective units.

A further object of the invention is to provide an airplane wing or similar beam constructed in upper and lower units detachably connected together and assembled to form a complete beam.

A further object of the invention is to provide a wing rib or truss formed in upper and lower units detachably connected together and assembled to form a complete rib or truss.

A further object of the invention is to provide certain improvements in the construction and in the arrangement and assembly of structural elements of all-metal airplane wings, in order to form a wing of high aerodynamic efficiency which can be rapidly manufactured at relatively low cost with a minimum possibility of structural defects or defects due to errors in assembly.

With the foregoing and various other objects and results in view, which other objects and results will be clearly apparent to and understood by those familiar with the aeronautical art, the invention consists in certain novel features in construction and in arrangements and combinations of elements, as will be more fully and particularly pointed out and specified hereinafter.

Referring to the accompanying drawings:

Fig. 1, is a vertical transverse section, more or less diagrammatical, through an assembled airplane wing embodying features of the invention and disclosing one construction and arrangement thereof.

Fig. 2, is a view similar to Fig. 1, showing the wing disassembled with the elements thereof in relative position for assembly to form and complete the wing.

Fig. 3, is a vertical transverse section, more or less diagrammatical, through a wing of a different construction and arrangement of the form of Fig. 1, and showing the wing disassembled with the units and elements thereof in relative position for assembly.

Fig. 4, is a vertical transverse section, more or less diagrammatical and omitting portions of the section lines for clearness, through an assembled wing embodying the invention of a type in which the wing beams are formed in upper and lower units detachably connected.

Fig. 5, is a view similar to Fig. 4, and showing the type of wing thereof disassembled with the units and elements thereof in relative position for assembly.

Fig. 6, is a detail perspective view of a portion of a wing spar or beam of the type shown in Figs. 4 and 5, with the upper and lower units thereof in assembled connected position to form the wing beam.

Fig. 7, is a detail view in vertical transverse section through a portion of an assembled wing spar of the type disclosed in Fig. 6.

As illustrative of the principles of the invention, and as an example of aircraft elements possessing the structural characteristics to which the invention and the various features thereof are applicable, airplane supporting surfaces or wings embodying the invention are disclosed in the accompanying drawings and explained and described hereinafter. In the illustrated examples, supporting surfaces or wings of the all-metal type are disclosed because the various problems solved and difficulties overcome by the construction and method of the invention are encountered and met with in the construction, assembly and use thereof in a high degree, and hence they serve to more clearly bring forth and illustrate the invention and the advantages and results obtained thereby. However, it is not intended or desired to limit the invention to supporting surfaces or wings of the all-metal types, nor to limit the invention to application to supporting surfaces or wings, as it will be readily apparent to those familiar with the aeronautical art that the invention and the principles thereof are equally applicable to wings formed of other materials than metal, as well as applicable to aircraft elements generally which possess the broad structural characteristics of a frame or equivalent structure covered by and enclosed within a skin or covering attached thereon and thereover.

In Figs. 1 and 2 of the accompanying drawings, a portion of one form of an all-metal airplane supporting surface or wing embodying certain features of the invention, is illustrated. This form of the invention comprises a series of transversely spaced longitudinal wing spars or beams 1, 2, 3, 4 and 5, each formed, with the exception of the outer rear beam 5, of the spaced upper and lower tube longitudinals 10 and 11, respectively, connected and interbraced by the bracing or trussing 12. In the present instance, the outer rear wing spar or beam 5 is formed by the single longitudinal tube 10. The wing beams 1, 2, 3, 4 and 5 are formed of different depths and are arranged with respect to each other in assembled position in the wing to define the varying depth transversely thereof, in the usual manner.

A series of contour formers or chord members 14 are positioned extending transversely across the upper tube longitudinals 10 and spaced longitudinally along the wing beams. In the example illustrated the upper chord members 14 extend forwardly a distance beyond the outer front wing spar or beam 1, and extend rearwardly to and terminate at the rear wing beam 4. The chord members 14 are preferably, although not essentially, formed of substantially U-shape in cross section and are positioned on and across the wing beams with the open sides thereof toward and against the tube longitudinals thereof. At the points of contact and engagement with the tube longitudinals of the wing beams, the contour formers or chord members 14 are flattened by spreading the sides thereof laterally, and are attached on and to the tube longitudinals by the rivets 15 secured through the members 14 and the adjacent walls of the tubes 10, respectively. A similar series of contour formers or chord members 16 are secured transversely across the opposite or lower sides of the wing beams directly below and in the same vertical planes with the upper chord members 14, respectively. The lower chord members 16 extend forwardly to and terminate at the outer forward wing beam 1, and extend rearwardly to and terminate at the outer rear wing beam 5. The chord members 16 are secured and attached to the lower tube longitudinals 11 of the wing beams, and to the tube 10 forming beam 5, by means of the rivets 17, in a manner similar to that described with reference to the attachment of the upper chord members to the tubes 10 by means of the rivets 15.

Each pair of upper and lower chord members 14 and 16, respectively, is provided with suitable interbracing or trussing 18 extended and secured therebetween. The interbracing may be formed of a single continuous member, or of a series of members extending between each pair of upper and lower chord members 14 and 16, and between the wing beams across which the chord members extend and to which they are attached. In the embodiment of the invention disclosed in Figs. 1 and 2 of the drawings, the interbracing or trussing 18 between each pair of upper and lower chord members, extends from the forward end of the upper chord member 14 to the lower chord member 16 at the point of attachment to the tube longitudinal 11 of the forward wing beam 1; upwardly from beam 1 to the upper member 14 at its point of attachment with tube 10 of beam 2; downwardly to member 16 at its point of attachment to tube 11 of beam 3; upwardly to member 16 at the point of attachment to tube 10 of beam 4; and downwardly to the lower chord member 16 at its point of attachment to the tube longitudinal 10 constituting wing beam 5.

Preferably, the interbracing forming the trussing 18 between the upper and lower chord members 14 and 16, is formed of U-shape in cross section similar to the chord members, although it is not desired to limit the trussing to this form or shape. The forward end of the bracing or trussing between each pair of chord members, is flattened or spread and attached to the forward end of the upper chord member 14 by means of a rivet or the like 19, and the bracing is flattened at the points of engagement wtih the wing beams and secured and attached thereto between the adjacent tube longitudinals thereof and the chord members by means of the attaching rivets 15 and 17, respectively, which secure and attach the chord members to the respective tube longitudinals of the wing beams.

Thus, from the foregoing description in connection with Figs. 1 and 2 of the drawings, it is seen that each pair of upper and lower chord members with the interbracing or trussing 18 therebetween forms a wing rib or truss extending transversely of and attached to the longitudinal wing beams, and that the series of such ribs so formed, together with the series of longitudinal wing beams provides a trussed and braced frame adapted to be enclosed within a suitable skin or covering to form the complete wing, or section thereof, of the desired aerofoil section. Various other forms and arrangements of interbracing and trussing between and forming the wing ribs with the chord members may be utilized, as will be clear to those skilled in the art and it is not intended to limit the invention to the form shown and described herewith by way of an example.

The wing frame so formed and embodying certain principles of the invention is covered by and enclosed within a suitable skin or covering. In the present instance this skin or covering is formed of metal, smooth or corrugated, attached on and over the upper and lower sides of the frame. The upper surface of the wing is formed by the metal skin 20, which may be a single piece or be formed of strips or sheets, riveted to the upper chord members 14 of the wing frame by means of the rivets 15, and suitably attached to the frame between the spaced upper chord members by means of rivets or the like along and secured to the upper tube longitudinals of the wing beams. The lower surface of the wing is formed in a similar manner by the metal skin 21 attached to the lower chord members 16 by the rivets 17 and suitably attached along the lower tube longitudinals of the wing beams between the spaced chord members 16. The upper and lower skin or covering 20 and 21 extend forwardly a distance and are curved inwardly toward each other with their forward edge portions attached together by rivets 22 to form the leading edge of the wing. If desired a strengthening bar 23 may be attached over the connected edges of the upper and lower coverings 20 and 21 to stiffen the leading edge portion of the wing. The rear edge portions of the upper and lower skin or coverings are extended rearwardly where they converge and are attached together by the rivets 24, or other suitable attaching means. With the upper and lower metal coverings in attached position on and over the wing frame they provide a metal skin enclosing the wing frame and forming therewith the complete wing, or section or panel thereof, of the desired aerofoil section. The metal skin so mounted and attached performs a further function of strengthening and reinforcing the wing frame and completed wing structure, as will be clear to those skilled in the art.

In accordance with the invention, the wing above described is formed of an upper unit and a lower unit which may be detached for disassembling the wing for inspection, replacement, or repair. In Fig. 2 of the drawings the wing of Fig. 1 is disclosed with the units in detached position for assembly. The upper unit A, in the example shown, comprises the wing beams 1, 3 and 5, the upper chord members 14 with the interbracing and trussing 18, and the upper skin 20 attached in position on and to the chord members and the tube longitudinals 10 of the wing beams 1, 3 and 5. The lower unit B, comprises the alternate wing beams 2 and 4 with the lower chord members 16 attached thereacross, and the lower skin 21 attached to the chord members and the tube longitudinals 11 of the beams 2 and 4.

In assembling the units to form the complete wing, the upper unit A is mounted and fitted onto the unit B, so that the wing beams 1, 3 and 5 thereof alternate with the beams 2 and 4 of the lower unit, and with the upper chord members 14 and interbracing or trussing 18 thereof, directly above and in line with the lower chord members 16, respectively, so that the interbracing 18 is in position with respect to each pair of upper and lower chord members, respectively, to form a complete trussed rib therewith. The upper and lower units A and B are secured and attached in the above referred to wing forming position, by riveting the upper chord members 14 and bracing 18 to the upper tube longitudinals 10 of the beams 2 and 4, at their points of engagement therewith, by means of the rivets 15; and by riveting the lower chord members 16 to the lower tube longitudinals 11 of the beams 1, 3 and 5 and bracing 18 thereon, at their points of engagement therewith, by means of the rivets 17.

The upper skin 20 is riveted along the tube longitudinals 10 of beams 2 and 4 between the spaced upper chord members 14, and the lower skin 21 is riveted along the tube longitudinals 11 of beams 1 and 3, and tube 10 of beam 5, between the spaced lower chord members 16. The riveting of the units A and B together as above described is performed by drilling through the skin and tubes to provide bores therealong to receive the rivets, then inserting suitable mandrels (not shown) in and through the tubes to back up the rivets. Then, by driving the rivets against the mandrels the rivets can be properly secured in position attaching the skin to the tube longitudinals. Preferably, the riveting operation is commenced at one end of the tubes, and as the rivets are driven to attached position the mandrels are drawn outwardly toward the opposite end of the tubes. With the units A and B, so formed, secured together to provide the completed wing frame with the skin attached in position thereon, the wing is closed and completed by attaching and securing the forward edge portions of the upper and lower skin or coverings 20 and 21 together by means of rivets 22 and channel bar 23; and by attaching the rear edge portions of the skin together by means of the rivets 24.

The upper and lower wing units A and B are constructed by assembling the wing frame portions thereof, and then attaching the portions of the wing skin thereon and thereto to form the completed units for assembly and attachment to form the wing. By thus constructing and assembling the units, unrestricted space is obtained on both sides of the portions of the skin of each unit to permit of ready access to the skin in assembling and attaching the same to the frame portion of the unit. With the units so constructed, and each having a portion of the total wing skin or covering attached thereon in proper position before assembly of the wing, a complete wing can be quickly and efficiently constructed by assembling and securing the units together, as above indicated, and the difficulties encountered in applying and attaching the skin to and closing a complete assembled wing frame are overcome. A complete wing so constructed and assembled, can be disassembled for inspection, repair or replacement by removing the rivets or other attaching means with which the units are secured in wing forming relation, and the units separated, as clearly indicated in Fig. 2. This disassembly can be carried out without removing or detaching the wing skin or covering from attached position on the wing frame units, as will be clear and readily apparent from the foregoing description in connection with the drawing disclosures.

In Fig. 3 of the accompanying drawings, a modified arrangement and construction of the upper and lower wing forming units, A and B is illustrated, in which the interbracing or trussing 18 between the pairs of upper and lower chord members 14 and 16, which forms therewith the wing ribs, is attached to and forms a part of the lower wing unit B. The assembly and attachment of the wing units A and B of the arrangement of Fig. 3, is similar to and will be clear from the description of the method of constructing and assembling the units of the arrangement of Figs. 1 and 2. The principles of the invention as exemplified in Figs. 1 to 3 of the drawings may be physically expressed in other forms and arrangements. If desired the transverse bracing forming the trussing between the pairs of upper and lower chord members can be divided between the upper and lower wing forming units A and B, and various other forms and types of such bracing and trussing can be employed, as well as various drift or interrib bracing, tie rods and the like, as will be clear to anyone familiar with the aeronautical art.

A modified type of wing or similar aircraft element, embodying the basic and other principles and features of the invention, is illustrated in Figs. 4 to 7, of the accompanying drawings. In this type not only the wing ribs as in the form of Fig. 1, but the longitudinal wing beams, are formed in sections or units, and the complete wing structure is formed of upper and lower units detachably secured and attached together in such a manner that in disassembling and assembling the wing it is not necessary to detach or attach the skin or covering from or to the wing frame, it being merely necessary to detach or attach the leading and trailing edge portions of the skin.

The illustrated embodiment of the above principles of the invention comprises a series of longitudinal wing spars or beams 25, 26 and 27, of varying depths and relatively arranged and spaced transversely of the wing to determine the varying depth of the wing. These wing spars are of similar form and construction and each consists of an upper longitudinal section or unit C, and a lower longitudinal section or unit D. The construction and arrangement of the upper and lower units C and D, and of a wing beam formed thereof, is illustrated in detail in Figs. 6 and 7 of the drawings. Each upper and lower unit C and D of a wing beam is formed of the plates or strips 28 and 29 placed together and riveted, as by a series of rivets 30. The plates 28 and 29 are provided with lightening holes or openings 31 having the edge portions thereof flared or bent outwardly to increase the strength of the plates. The upper longitudinal edge portions of the plates forming the beam unit C are rolled outwardly and downwardly to provide the opposite laterally extending roll flanges 32; and the lower longitudinal edge portions of the plates forming beam unit D are rolled outwardly and upwardly to provide the opposite laterally extending roll flanges 33, similar to the flanges 32 of unit C. The lower longitudinal portions of plates 28 and 29 of unit C, are bent outwardly to provide opposite laterally extending portions having their outer edges bent upwardly therefrom to form therewith the opposite laterally extending L-flanges 34. The upper longitudinal portions of plates 28 and 29 forming beam unit D are bent to provide opposite laterally extending portions having their edges bent downwardly to provide the L-flanges 35, similar to the flanges 34 of unit C.

The upper and lower wing beam units C and D are assembled in vertical alinement with the L-flanges 34 of unit C abutting and bearing on the L-flanges 35 of unit D. A series of short taper pins 36 are secured at spaced intervals along and depending downwardly through the opposite laterally extending portions of the L-flanges 34, respectively, of unit C, and a series of spaced bores are formed at corresponding spaced intervals through the opposite laterally extending portions of L-flanges 35 of unit D, which bores receive the taper pins 36 of flanges 34 and properly aline and maintain the upper and lower units C and D in assembled beam forming relation. In assembled position of the upper and lower units C and D, the abutting L-flanges 34 and 35 on each side of the beam extend laterally therefrom to form a projecting portion of T-shape in cross section (see Fig. 7) with the head thereof at the outer end spaced from and disposed substantially parallel with the beam web formed by the vertically alined plates 28 and 29 of the upper and lower beam units C and D, respectively.

The beam units C and D are detachably coupled and locked together in assembled beam forming position to form a rigid beam, in such a manner that the units may be readily uncoupled and detached to disassemble the beam so formed. In the present example, the means for detachably coupling and locking the beam units C and D together in beam forming position and relation comprises a pair of channel bars or connecting members 37, each provided, if so desired, with a series of spaced strengthening fins or ribs 38 extending laterally from the closed side thereof. In order to couple and lock the upper and lower units C and D together to form a complete rigid wing beam, the connecting members or channel bars 37 are fitted over and forced to slide longitudinally onto the abutting L-flanges 34 and 35, respectively, extending from opposite sides of the beam web, in position securely coupling and binding the upper and lower units C and D together, as clearly shown in Figs. 6 and 7 of the accompanying drawings. With the upper and lower units C and D detachably locked together by means of the connecting members 37, a rigid beam is formed in which relative longitudinal movements and longitudinal shear between the connected upper and lower beam units is prevented by the series of taper pins, or the like, 36 extending through the abutting L-flanges, respectively, of the units. The wing beam so formed can be readily disassembled by forcing the connecting members 37 from position on and over the abutting L-flanges of the units, and detaching and separating the units.

The wing of Figs. 4 and 5, is formed of the upper and lower units E and F which are constructed separately and then assembled to form the complete wing. The lower unit F of the wing comprises the spaced lower units D of the series of wing beams 25, 26 and 27, respectively. A series of transverse contour formers or chord members 40 extend across and are spaced longitudinally along the lower sides of the units D, and are attached and secured to the base forming oppositely extending roll flanges 33 of the units D by means of rivets or the like 41. The chord members 40 extend a distance forwardly and rearwardly beyond the outer beam units D, respectively, and a series of braces are connected between each chord member and the beam units D to form trussing and bracing therefor. In the present example, each chord member 40 is provided with a brace 42 extending rearwardly and upwardly from the forward end thereof to the unit D of the forward wing beam 25, and a brace 43 extending forwardly and upwardly from the rear end thereof to the unit D of the rear wing beam 27. At the intermediate unit D of beam 26, each chord member is provided with a pair of braces 44 extending upwardly therefrom at points adjacent the forward and rear beam units D, respectively, to opposite sides of the intermediate beam unit D.

The lower beam units D with the transverse chord members 40 attached thereto and the bracing between units D and members 40 are provided with the lower skin 45 of the wing. The skin 45 may be formed of smooth or corrugated metal applied as a single plate or sheet, or formed and applied in strips or the like. In whatever form used, the skin 45 is riveted to the transverse chord members and the roll flanges 33 of the lower beam units D by means of the rivets 41 which secure the members 40 to units D, and to the beam flanges 33 between the spaced chord members 40 by rivets or the like attaching means. The skin 45, so attached, extends forwardly and rearwardly beyond the members 40 and forms therewith and with the beam units D and trussing therefor, the lower unit of the complete wing. It will be noted that in constructing and assembling the wing unit F, the skin 45 thereof can be readily attached thereon and thereto, as there is no interference from the unit structure and the skin attaching rivets are accessible for backing up and driving from either side of the unit. Likewise in assembling the frame structure of the unit no interference is encountered as all parts thereof are accessible.

The upper wing unit E is formed, constructed and assembled in a similar manner to that of lower wing unit F. Upper unit E comprises the upper units C of the wing beams 25, 26, and 27, arranged spaced apart transversely of the wing corresponding to the position of lower beam units D of lower wing unit F. A series of contour formers or chord members 46 extend transversely across and spaced longitudinally of the upper beam units C corresponding to the spacing of lower chord members 40. The members 46 are attached to the roll flanges 32 of the beam units C by the rivets 47. Each chord member 46 and the beam units C are provided with braces forming trussing therebetween arranged in a manner corresponding to the braces 42, 43, and 44 of the lower wing unit F; brace 48 from the forward end of each member 46 to the forward unit C; brace 49 from the rear end thereof to rear unit C; and braces 50 extending from opposite sides of the intermediate beam unit C to each member 46. The upper skin or covering 51 of the wing is secured on and attached to the upper unit frame, so formed, by means of rivets 47 to the members 46 thereof, and to the roll flanges 32 of the beam units between the members 46, by any suitable attaching means. The skin 51 extends forwardly and rearwardly a distance beyond the members 46, corresponding to the extension of the skin 45 on the lower wing unit.

With the upper and lower wing units E and F formed and arranged as described, a complete wing can be readily and quickly assembled therefrom in the following manner. The upper unit E is placed onto the lower unit F with the upper beam units C alined with and bearing upon and abutting the lower beam units D, respectively, and with the series of upper chord members 46 directly above and respectively alined with the lower chord members 40. In this position of the wing units the proper alinement and relative assembled position thereof is attained by means of the pins 36 in the L-flanges 34 of the upper beam units C, fitting into and received by the series of bores, respectively, in the L-flanges 35 of the lower beam units D. The pairs of spaced vertically alined upper and lower contour formers or chord members 46 and 40, with the respective bracing thereon extending therefrom to the beam units to which the members are respectively attached, provide a series of trussed ribs extending transversely through and spaced longitudinally along the complete wing, each of which trussed ribs is formed in units providing a part of the upper and lower wing units, respectively.

The upper and lower wing units E and F are secured and attached together in wing forming position and relation by means of the beam unit connecting members or channel bars 37. With the wing units in wing forming position the upper and lower beam units C and D forming the series of wing beams 25, 26, and 27, respectively, are attached together by forcing a pair of the connecting members 37 over and onto the oppositely extending pairs of L-flanges 34 and 35, respectively, of each beam in a manner hereinbefore described, thus attaching the beam units C and D together to form the series of rigid wing beams 25, 26 and 27 extending longitudinally through the wing. The attachment and connecting of the beam units attaches and rigidly secures the upper and lower wing units E and F, of which the upper and lower beam units, respectively, form component parts, together to form the complete wing. The connecting members or channel bars 37 are forced onto the wing beam units from the in-board or open end of a complete wing, and in the case of a wing section or panel may be applied from either end thereof, as desired.

After attachment and securing of the upper and lower wing units together, the wing is readily closed by connecting the forward edge portion of the upper and lower skin 51 and 45 together by means of a channel bar or the like 53 and the rivets 54, to form the leading edge portion of the wing; and by connecting the rear ends or edge portions of the upper and lower skin or covering together by means of rivets or such like attaching means 54, to form the trailing edge portion of the wing. Thus, the complete wing is readily assembled and constructed from the upper and lower wing units E and F, with the wing frame enclosed within and covered by the skin without encountering working interference in attaching and closing the skin due to restricted and confined working spaces in which to apply and secure the skin attaching means, such as the rivets disclosed. If desired tie rods or the like 55 may be extended through the wing to additionally lock and bind the units E and F together in wing forming relation, and various other arrangements of tie rods, drift bracing and the like may be employed. Other types and arrangements of the wing rib trussing and bracing of each wing unit which form the complete wing ribs in assembled position of the units, may be employed, and it is not desired to limit the invention to the specific example shown and described.

The wing as above described can be readily disassembled for inspection, repair and replacement, without detaching the upper and lower lower skin 51 and 45 from the wing frame units. In disassembling the wing, the leading and trailing edge portions of the skin are detached and the connecting members or channel bars 37 are withdrawn from the wing beams, and if employed, the tie rods and such like bracing and trussing means are disconnected (see Fig. 5), after which the upper and lower units can be detached and separated.

By the invention an airplane supporting surface or wing and such like aircraft element, is formed and constructed in upper and lower units, which when assembled and attached together provide a complete wing including a wing truss or frame and a skin or covering attached thereon and enclosing the same to form the upper and lower wing surfaces. The method of constructing and assembling a wing, or similar aircraft element, embodying the invention, consists in constructing separate upper and lower units each so arranged that when assembled they form the complete trussed wing frame; attaching and securing on the upper unit before assembly the skin forming the upper surface of the wing, attaching and securing the skin forming the lower surface of the wing, on and to the lower unit of the frame before assembly; bringing the upper and lower units with the wing skin attached thereon into assembled position and relation to form the wing frame with the upper and lower skin forming the wing surfaces in position thereon; and then closing the wing by attaching the leading and trailing edge portions of the upper and lower skin together to enclose the frame and form and provide the complete wing. In the foregoing manner, as hereinbefore described and explained in detail, the various difficulties encountered in applying and properly attaching the wing skin or cover on and enclosing the wing frame are materially reduced and practically eliminated. The time and labor involved in the construction and assembly of such types of wings and similar aircraft elements, are thereby materially reduced. which permits of an increase in production thereof at a reduced cost.

Attention is directed to the fact that the use of airplane wings as an example of the invention, and the use of the term "wing" in the claims is intended to include panels or sections of wings, and to further include any and all aircraft elements of similar structural characteristics, to wit; a frame truss or the like structure enclosed within and covered by a skin or covering, where similar or equivalent conditions may be encountered in construction and assembly, or where it is desired to obtain the results of the construction and method of the invention.

It is evident that various changes, modifications, variations and substitutions might be resorted to without departing from the spirit and scope of the invention, and hence I do not wish to limit my invention to the exact and specific disclosures hereof.

Desiring to protect my invention in the broadest manner legally possible, what I claim is:

1. In an aircraft element including a frame enclosed within and covered by a skin, the frame formed in upper and lower units detachably connected, and each unit having a portion of the enclosing skin attached thereon.

2. In an aircraft element including a frame enclosed within a skin attached thereon, the frame formed of units detachably connected, and the units each having a portion of the total enclosing skin attached in position thereon, such that in assembled position of the units the frame formed thereby is enclosed within a skin formed of said portions.

3. In an aircraft element including a trussed frame enclosed within a skin attached thereon, the frame formed of units so constructed and arranged as to provide the complete trussed frame in assembled position of the units, each unit having a portion of the total skin attached thereon, and said skin portions connected together to enclose said frame.

4. In an aircraft element including a trussed frame enclosed within a skin attached thereon, the frame formed of units so constructed and arranged that in assembled position thereof the frame and trussing therefor is formed, and units detachably assembled in frame forming relation and each having a portion of the frame enclosing skin attached thereon, and the said skin portions detachably secured together to form the frame enclosing skin with said units in assembled position.

5. In a metal airplane wing including a wing frame enclosed within a skin attached thereon, the wing frame formed of an upper unit having the upper surface of the wing skin attached thereon, and a lower unit having the lower surface of the wing skin attached thereon, the said units with the upper and lower skin thereon detachably joined to form the wing, the skin of each unit accessible at both sides thereof with the units detached.

6. In an airplane wing including a wing frame formed of longitudinal beams and transverse rib forming trusses, said frame formed of an upper unit and a lower unit, and the said beams and rib forming trusses divided between and forming component parts of said units, so that in assembled position of said units the complete longitudinal beams and transverse rib forming trusses are provided to form the wing frame, said frame units detachably secured together in frame forming position.

7. In an all-metal airplane wing including a frame enclosed within a skin, the frame formed of upper and lower units with each of said units having a portion of the total wing skin attached thereon, and the said units and skin portions thereof detachably secured together in assembled wing forming position.

8. In an airplane wing including a frame enclosed within a skin, the frame formed of an upper unit having the upper surface of the enclosing skin attached thereon and a lower unit having the lower surface of the enclosing skin attached thereon, the said units detachably secured together to form the wing frame, and the leading and trailing edge portions of the upper and lower surfaces of the skin detachably connected to close and form the complete wing.

9. In an airplane wing, a trussed wing frame formed of upper and lower units secured together to form the complete frame, a skin forming the upper surface of the wing attached on the upper frame unit, a skin forming the lower surface of the wing attached on the lower frame unit, said upper and lower skin secured together at the leading and trailing edge portions, respectively, to enclose the frame and form the complete wing therewith, and the wing so formed separable into said upper and lower frame units without detaching the upper and lower skin from position thereon, respectively.

10. In an airplane wing, a wing frame including a series of longitudinal wing beams each comprising an upper section and a lower section, said wing frame formed of an upper unit and a lower unit with the upper and lower sections of said series of wing beams included in and forming parts of said upper and lower frame units, respectively, the said upper and lower units assembled and secured in frame forming position by detachably connecting the upper and lower sections of said units, respectively.

11. The method of constructing and assembling all-metal airplane wings, which consist in forming a wing in upper and lower units; assembling the units in wing forming position; and then attaching the units in assembled position to form the complete wing.

12. The method of constructing and assembling all-metal airplane wings, which consists in constructing the wing frame in separate units; applying and riveting the wing skin on the separate frame units before assembly thereof; assembling the units into wing forming position; and then riveting the skin together to enclose the frame and form the complete wing therewith.

13. The method of constructing and assembling all-metal airplane wings, which consists in constructing the wing frame in separate upper and lower units; applying and attaching the upper and lower skin of the wing separately to the upper and lower frame units, respectively, before assembly of such units; assembling and securing the frame units together in frame forming position; and then securing the leading and trailing edge portions of the upper and lower skin, respectively, together to close and complete the wing.

14. The method of constructing and assembling all-metal airplane wings, which consists in constructing the wing frame in separate upper and lower units; applying and attaching the upper and lower skin of the wing separately to the upper and lower frame units, respectively, before assembly of the units; assembling and detachably securing the frame units together in frame forming position; and then detachably securing the leading and trailing edge portions of the upper and lower skin, respectively, together to close and complete the wing.

15. The method of constructing and assembling all-metal airplane wings, which consists in forming the wing frame in separate upper and lower units each of which includes a portion of the longitudinal frame beams; applying and attaching the upper and lower skin of the wing separately to the upper and lower frame units, respectively, before assembly of the units; assembling and securing the frame units in frame forming position with the portions of the longitudinal beams positioned to form the complete longitudinal wing beams, respectively; and then securing the adjacent edge portions of the upper and lower skin, respectively, together to close and form the complete wing.

16. In the art of constructing and assembling all-metal airplane wings, those steps which consist in; constructing a metal wing frame in separate upper and lower units; and then applying and attaching the upper and lower metal skin of the wing separately to the upper and lower frame units, respectively with both sides of the upper and lower skin accessible, respectively.

17. The method of constructing and assembling all-metal airplane wings, which consists in constructing the wing frame in separate units; attaching a portion of the metal wing skin to each frame unit before assembly thereof; assembling and attaching the wing frame units with the portions of the wing skin thereon into wing frame forming position; and then attaching the leading and trailing ends of the skin portions into frame closing position to complete the wing.

18. The method of constructing and assembling all-metal airplane wings embodying a metal wing frame and a metal skin, which consists in constructing the metal wing frame in separate units; attaching on each frame unit before assembly of the units a portion of the total metal wing skin, in such position thereon, respectively, that in assembled position of the frame units the metal wing skin on the frame is formed; and then assembling and attaching the frame units in wing frame forming position with the skin portions on the units forming the wing therewith.

19. In an all-metal airplane wing, a metal wing frame formed of separate units detachably secured together in frame forming relation, and a metal wing skin secured to said units and detachably fastened in position enclosing the frame to form the wing, the said frame units detachable without removing the wing skin therefrom, respectively.

20. In an all-metal airplane wing, a metal wing frame formed of separate units detachably secured together, and a metal wing skin formed in sections secured to said frame units, respectively, the said skin sections extended beyond the wing frame and detachably secured together to form the wing.

Signed at Ithaca, New York, this 27th day of Januray, 1923.

RANDOLPH F. HALL.